April 21, 1931.  A. A. OUSS  1,801,933
FILTER PRESS
Filed March 6, 1929
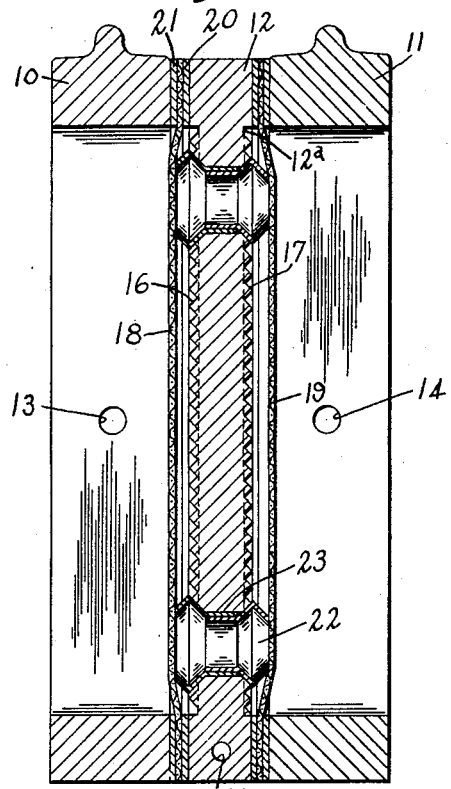
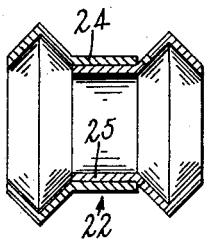
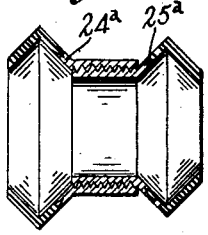
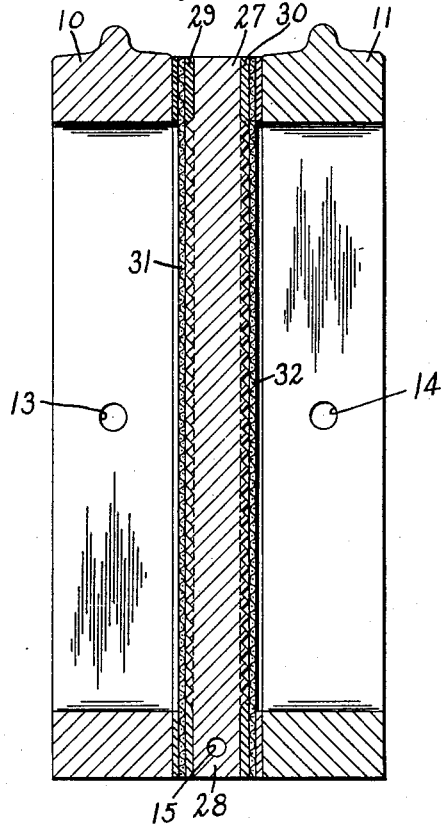
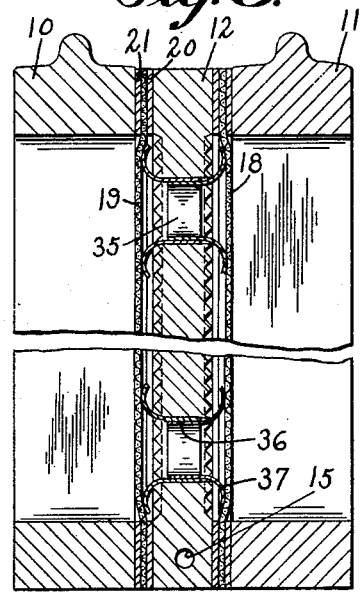

Patented Apr. 21, 1931

1,801,933

UNITED STATES PATENT OFFICE

ANDREW A. OUSS, OF NEW YORK, N. Y.

FILTER PRESS

Application filed March 6, 1929. Serial No. 344,690.

This invention relates to filter presses and has to do more especially with the filter cloth and means for supporting this cloth upon the filter plate.

In the ordinary form of commercial filter presses, a number of filter plates are employed, these plates having drainage surfaces which are provided with corrugations or pyramids to provide for free drainage of the filtered liquid. The filter cloth is supported upon the plates adjacent these surfaces and is usually tightly secured to the plate about its periphery. As a result, the cloth is stretched over the plate in a fairly taut condition. In use, the liquid to be filtered is pumped into the press under considerable pressure. At the beginning of a filtering operation, this pressure may be relatively small but as the operation proceeds it is increased until it reaches a pressure of from 60 to 150 pounds per square inch, depending upon the material to be filtered and other conditions.

The filter cloth itself is naturally relatively weak even though made of metallic wire, as is often the case, and when subjected to this relatively great pressure is quite apt to break down and become torn and must then be replaced. This is due to the fact that the cloth is in a relatively taut condition and on account of the uneven surface of the filter plate, the cloth is not supported by that plate except at spaced points, if at all, and the tendency of the cloth to fill up the irregularities of the plate under pressure causes it to be stretched beyond the breaking point.

One object of my invention is the provision of a filter plate having a filter cloth supported thereon in a manner to prevent the tearing or destruction of the cloth under pressure.

A still further object of the invention is to provide a method of securing a filter cloth to a filter plate in such a manner that the cloth will be permitted to yield under the filtering pressure to which it is subjected, so as to prevent the usual destructive action of such pressure upon the cloth.

A still further object of the invention is the provision of a filter plate having a cloth secured thereto in such a manner that the cloth will be supported by the plate and will be better able to resist the destructive action of filtering pressures.

More specifically I contemplate in a preferred embodiment of my invention, the provision of resilient supporting members which may be secured to the filter plate and which will support the filter cloth therefrom while at the same time permitting the cloth to yield under pressure instead of having to resist the filtering pressures in taut condition.

To these and other ends, the invention consists in the novel features and combinations of parts to be hereinafter described and claimed.

In the accompanying drawings:

Fig. 1 is a sectional view of a portion of a filter press embodying my invention;

Fig. 2 is a sectional view of one of the resilient supporting members employed to support the filter cloth from the filter plate;

Fig. 3 is a view similar to Fig. 2, showing a modified form of supporting member;

Fig. 4 is a view similar to Fig. 1, showing a modified form of the method of securing the filter cloth to the filter plate, and Fig. 5 is a view similar to Fig. 1, showing a further modification.

To illustrate a preferred embodiment of my invention, I have shown in Fig. 1 a section of a filter press in which are two frames 10 and 11, between which is mounted a plate 12. It will be understood that in the usual form of press, a number of frames and plates are employed, these being placed alternately throughout the length of the press. The frames 10 and 11, as shown, are provided with inlet openings 13 and 14 for the feeding of the liquid to be filtered, while the plate 12 is provided with a lower outlet opening 15 for the outlet of the filtrate. As the arrangement of inlet and outlet openings is of the usual form and well known in the art, additional description thereof is deemed unnecessary.

The filter plate 12 is provided with a peripheral rim portion and web or pyramid surfaces 16 and 17 which lie back of the filter cloths 18 and 19. Between the pyramid surfaces and the edge portions of the plate 12 are usually provided shoulders 12ª, so that the peripheral or edge portions are all substantially the same thickness as the thickness through the plate itself between the apices of the pyramids on opposite sides thereof.

The edges of the filter cloths extend between the edge portions of the plate 12 and the frames 10 and 11, and are, as is well understood, securely clamped in place. The filter cloth 18, for example, may be clamped at its edge between packing strips 20 and 21, one of such strips being adjacent the plate 12, and the other adjacent the frame 10.

I prefer to provide the filter cloths 18 and 19 of such a size that the area of each will be somewhat greater than the area of the adjacent surface of the filter plate 12. This excess of area will permit the cloth to assume a concavo convex form to some extent, and will thus enable it to yield so as to lie more or less tightly against the adjacent face of the plate 12 when subjected to filtering pressures. It will be apparent that under these circumstances the filter cloth will not be compelled to resist the filtering pressures when in taut condition, but will be permitted to conform to the surface of the filter plate to some extent before being stretched, and will not, in any case, be stretched beyond its breaking point.

As shown in Fig. 1 of the drawings, the filter cloth may be resiliently supported in spaced position from the plate. This may be effected by means of resilient supports 22, which are held in openings 23 in the plate. Any desirable number of these openings and supports may be provided in spaced positions about the plate 12. As shown in Fig. 2, the supports 22 may consist of similarly shaped telescoping sections 24 and 25, the telescoping parts of the sections being relatively small and the portion of one section fitting within the other. This construction will enable them to be readily inserted in the openings 23 from opposite sides of the plate 12. The ends of the sections 24 and 25 are enlarged by being flared outwardly so that they will remain in place when positioned in the plates and provide a substantial bearing surface for the filter cloth.

These supporting members as shown are preferably made hollow and are formed of a resilient material such as rubber, for example, when the liquid to be filtered will not have a deleterious effect upon such material. In the latter case, some other material could be used.

As shown in Fig. 3, the sections 24ª and 25ª of the supporting members may be provided with internal and external screw threads respectively, so that the parts of these members may be secured together in a positive manner.

In Fig. 4 of the drawings I have shown a modified form of my invention wherein the edges 27 and 28 of the filter plate are reduced in thickness so that at its peripheral portion the plate is not so thick as over the active area thereof. In this instance, the packings 29 and 30 will substantially make up the difference in the thickness between the peripheral portion and the central area of the plate, so that the filter cloths 31 and 32 will be supported substantially in a plane with the drainage surface of the plate and thus will be supported even before any pressure is applied to the press upon the pyramid surfaces on the plate. It will be understood that in the usual form in which the peripheral portion of the plate is not reduced in thickness, the edge portion of the filter cloth is supported beyond the pyramid surface of the plate, and in such case the active area of the cloth is not supported by this surface until placed under strain and stretched out of its normal position. Placing the cloth at the surface of the plate in this manner relieves in a large measure the strain to which the cloth will be subjected, and serves greatly to prolong its life.

In Fig. 5 of the drawings I have shown a filter press constructed in a manner similar to that described in connection with Fig. 1 of the drawings. In this instance, the frames 10 and 11 are mounted on opposite sides of the plate 12, and the filter cloths 18 and 19 are secured at their edges between the packings 20 and 21, between the filter plate and the frames. In this instance, the filter cloth is like that described in connection with Fig. 1, provided with an active area in excess of the area of the plate 12, so that the cloth will be permitted to move down upon the pyramid surface of the plate to be supported thereby when under pressure.

In this instance also, I provide resilient supporting members 35 which are somewhat similar in form to the supporting members 22. In this instance, however, the supporting members are preferably made of resilient metal and are made in two sections, each comprising a sleeve portion 36 and a pair of resilient arms 37, the sleeve portion 36 of one section being telescoped within the corresponding portion of the complemental section.

It will be apparent that I have provided means for securing a filter cloth to a filter plate in a press in such a manner that the destructive action of filtering pressures on the cloth will be avoided and the filter cloth will be permitted to yield to accommodate itself to these pressures without strain and consequent destruction of the cloth.

While I have shown and described some preferred embodiments of my invention, it will be understood that it is not to be limited to all the details shown but is capable of modification and variation within the spirit of the invention and within the scope of the appended claims.

What I claim is:

1. A filter plate having a filter cloth peripherally secured thereto, and supporting members secured to the plate in spaced relation and serving to support the cloth therefrom, when said plate is inoperative but permitting the cloth to lie upon the plate during the filtering operation.

2. A filter plate having a filter cloth peripherally secured thereto, and supporting members secured to the plate in spaced relation and serving to support the cloth therefrom, said supporting members being resilient to permit the cloth to lie upon the plate when the cloth is under pressure.

3. A filter plate having an irregular draining surface, a filter cloth secured thereto, said cloth in its normal condition and before pressure is applied thereto being supported from the surface of the plate, and being permitted to accommodate itself to the drainage surface of the plate under pressure.

4. A filter plate having a filter cloth peripherally secured thereto, and supporting members mounted between the cloth and plate and normally projecting beyond the surface of the plate, said supporting members being resilient to give way under pressure and permit the cloth to contact with the plate.

5. A filter plate having a filter cloth peripherally secured thereto, and supporting members mounted between the cloth and plate and normally projecting beyond the surface of the plate, said supporting members being resilient, and being mounted in and secured to the plate.

6. A filter plate having a filter cloth secured at each side thereof, and supporting members mounted within openings in the plate and having resilient portions extending without said openings on each side of the plate to support the filter cloths.

7. A filter plate having a filter cloth secured at each side thereof, and supporting members mounted within openings in the plate and having resilient portions extending without said openings on each side of the plate to support the filter cloths, each of said members being made in two sections having their inner ends entering the plate opening and engaged therein.

In witness whereof, I have hereunto set my hand this 2nd day of March, 1929.

ANDREW A. OUSS.